Aug. 2, 1932.    J. A. O'HALLORAN    1,869,492
COMPRESSING AND MOLDING MACHINE
Filed July 1, 1930    2 Sheets-Sheet 2
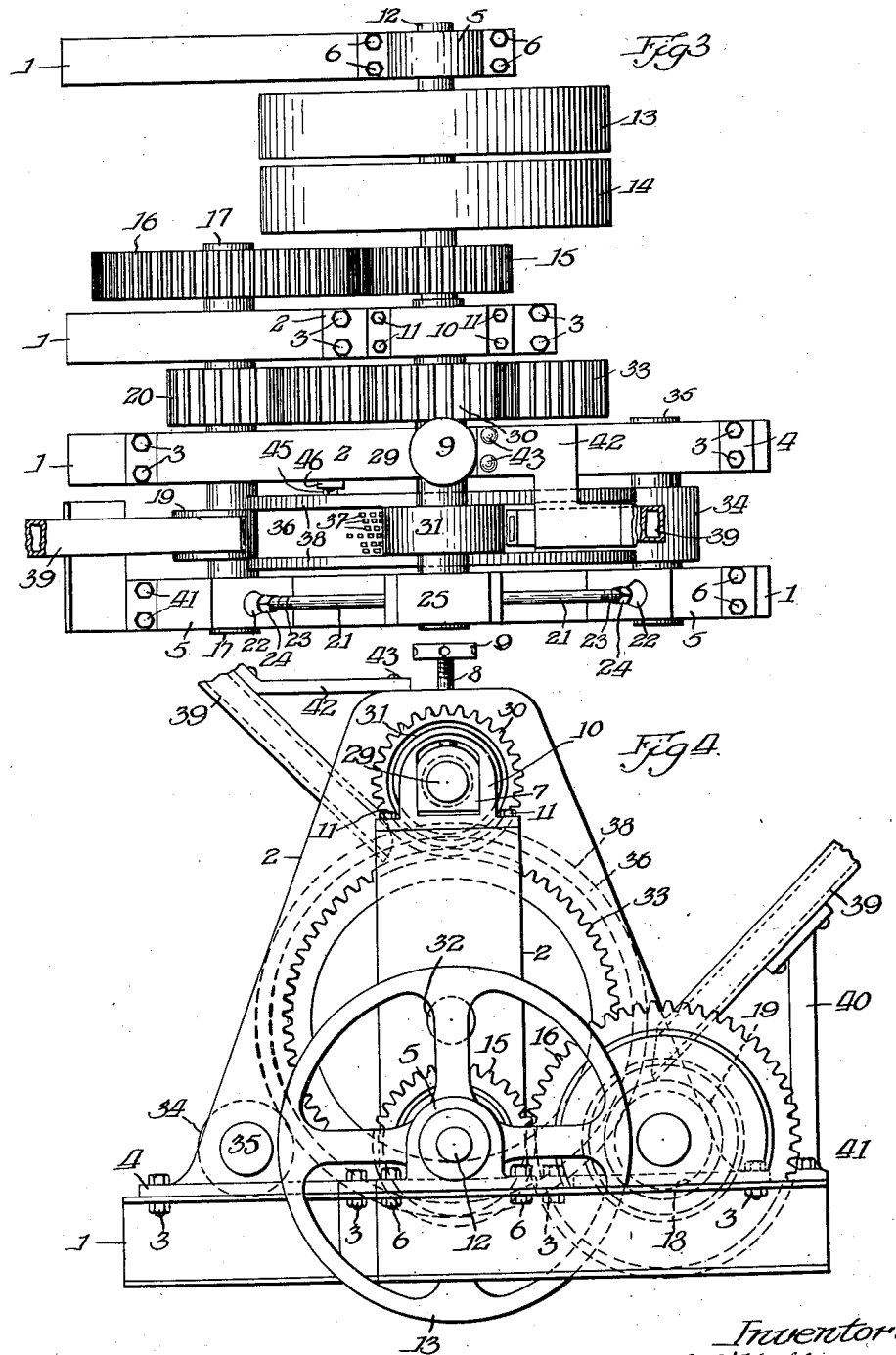

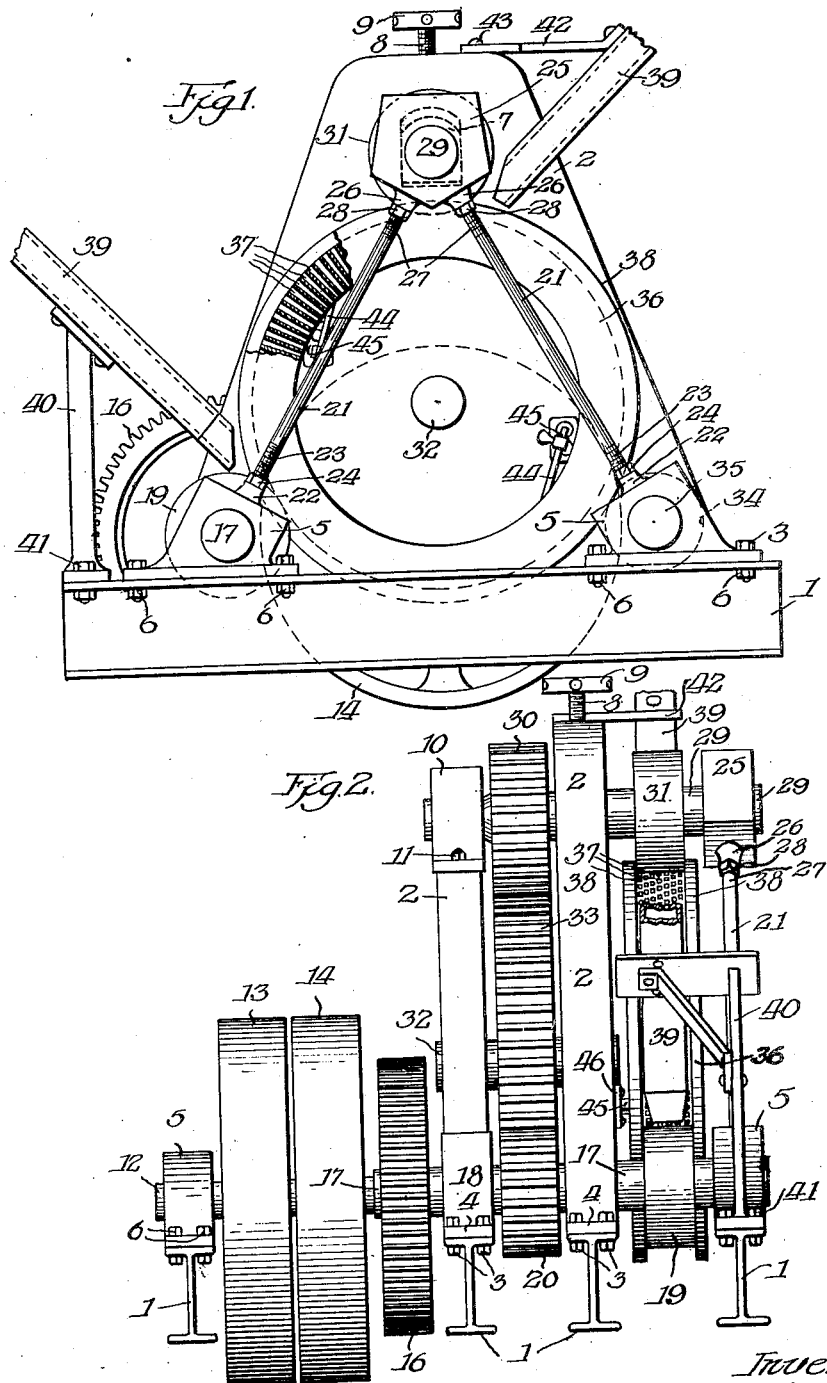

Patented Aug. 2, 1932

1,869,492

UNITED STATES PATENT OFFICE

JOHN A. O'HALLORAN, OF CLINTON, IOWA

COMPRESSING AND MOLDING MACHINE

Application filed July 1, 1930. Serial No. 465,162.

This invention relates to improvements in machinery for effecting the compressing and molding of plastic matters, the principal desiderata of the invention being to provide a machine of such character, especially advantageous for use in the rapid and efficient production of stock foods in block or cube form, the construction thereof being such that it may be operated at speeds materially greater than those obtainable in prior kindred apparatus and with but a minimum of power, hence, insuring peak volume production at materially less cost; a machine of comparatively simple yet rugged construction in which the number of working parts are few, thereby reducing wear, and one that because of its simplified construction will permit of continuous efficient operation at low cost as well as avoiding those losses incident to "shut-downs" for repairs and replacements.

Another and equally important object of the invention may be stated to reside in providing the machine with a novel form of mold wheel and combined plastic matter distributing and compressing means and support therefor, whereby the plastic matter to be compressed and molded will be uniformly spread over the outer periphery of the rotating mold wheel and caused to move into the mold pockets under force sufficient to compress the same to a high degree therein, following which the compressed and molded blocks are ejected and severed from the mold wheel adjacent its inner peripheral surface for discharge into a suitable receiving receptacle.

Yet another object of the invention is to provide supporting means for the rotatable mold wheel, serving in a dual capacity, to wit, as a means for rotatably supporting said mold wheel and preventing lateral shifting movement of the same with respect to said supporting means, consequently, constantly maintaining the effectual operative alignment therebetween and also, as a means for causing the plastic matter delivered to the mold wheel outer periphery to be distributed thereover and in the same operation, to be compressed to a predetermined or preadjusted degree within the mold wheel pockets in order that stock food blocks of the desired density will be produced when discharged from the mold pocket outlets.

Other objects of the invention will be in part obvious and in part pointed out hereinafter.

In order that the invention and its mode of operation may be readily understood by those skilled in the art to which it appertains, I have in the accompanying illustrative drawings and in the following detailed description based thereupon, set out one possible embodiment of my invention.

In these drawings:

Figure 1 is an end elevation of the improved machine having a portion of the rotatable mold wheel broken away and shown in section, Figure 2 is a side elevation of the machine, Figure 3 is a top plan view thereof, and Figure 4 is an elevation of the opposite end of the machine illustrating the arrangement of the gearing train for transmitting rotary motion to the mold wheel and to the combined supporting and compressing wheels.

Having more particular reference to the drawings, in connection with which like characters of reference will designate corresponding parts throughout, the machine may be stated to comprise bed or supporting bars, preferably in form of I-beams, generally indicated for convenience by the numeral 1, pillars or standards 2 being received upon the upper sides and connected to certain of said I-beams through the medium of bolts or similar fastening devices 3 passed through the apertured feet 4, upon the opposite extremities of the lower ends thereof. Bearing brackets designated by the numeral 5 are received upon the upper sides and secured to adjacent portions of the outermost I-beams as is shown in the Figure 2, said bearing brackets being fixedly secured in position through the medium of bolts 6 passing through the apertured lateral extremities formed thereupon. At this point, it may be noted that one of the pillars or standards 2 is of substantially upward tapered formation and is provided in its upper portion with an opening adapted to receive a bearing 7 therein, the upper side of this bearing being adapted to be engaged, at times, by a vertically disposed adjusting screw 8 turned into engagement with a suitably screw threaded opening formed in the upper or free extremity of said standard, and being provided with a hand wheel 9 whereby to facilitate rotation thereof. By rotation of this screw 8 through the hand wheel 9, vertical adjustment of the bearing 7 with respect to the opening receiving the same in the standard 2 is effected, the purpose of which will be subsequently described more in detail.

The remaining pillar or standard 2 is of substantially rectangular formation, as is shown in the Figure 4 and has mounted upon the upper and plane end thereof a bearing bracket indicated at 10, said bracket being provided upon its lower extremity with apertured lateral feet through which securing bolts 11 are passed into engagement with adjacent portions of the second mentioned standard 2 whereby to effect a positive fixing or mounting of the bracket 10 thereupon.

The bearings 7 and 10, carried by their respective standards 2 are adapted to be normally arranged in the same or approximately the same horizontal plane.

The intermediate portions of the standards 2 are each provided with horizontally aligning bearings (not shown in detail herein) whereby to receive and rotatably support thereupon a gear wheel, hereinafter described.

Disposed transversely of the portion of the frame constituted by the I-beams 1 is a driving shaft 12, one end of which is journalled in one of the bearing brackets 5 while the opposite or inner end of the same is journalled in a suitable bearing provided therefor in the lower portion of the adjacent standard or pillar 2. Mounted upon the intermediate portion of the shaft 12, between the bearing 5 and the pillar 2, is a pair of pulley wheels 13 and 14, one thereof being fixedly connected to the driving shaft 12 and the other being loosely mounted thereupon and serving as the usual idler. An endless power transmitting belt, not shown herein, is adapted to be engaged about the periphery of that pulley wheel fixedly connected to the driving shaft 12, whereby to permit of the transmission of rotary motion to the latter, while when it is desired to interrupt rotation of the driving shaft, the belt is, of course, merely lifted from the fixedly connected or driving pulley to the idler pulley which, as stated, is loosely mounted upon the driving shaft. A gear wheel 15 is keyed to the inner portion of the shaft 12 and meshes with a laterally offset and larger gear wheel 16 keyed to a counter shaft 17 journalled, at one end, in a bearing 18 provided or mounted in the lower portion of the standard 2, as is shown in the Figure 2, while its opposite or remaining end is journalled in one of the two bearings 5, mounted upon the outermost I-beam 1 of the machine bed, the intermediate portion of the countershaft 17, that is, that portion between the bearing 18 and the bearing 5, receiving its outer end, being engaged in a suitable bearing provided in the lower and adjacent portion of the remaining pillar or standard 2, which, as will be noted, receives and supports the adjustable bearing 7 in its upper extremity. Thus, it will be understood that a firm rotatable support or bearing will be provided the counter shaft 17 throughout its length and by consequence, said shaft may be subjected to heavy duty or stresses without effecting displacement or damaging thereof.

Fixedly mounted upon that portion of the counter shaft 17 between the bearing 5 and the bearing carried in the lower portion of the near standard 2, is a combined supporting and compressing roller 19, while upon that portion of said counter shaft 17 between the roller 19 and the gear wheel 16 and specifically, between the lower portions of the standards 2, is a rotary motion take-off pinion 20.

The relatively longitudinally spaced pair of bearings 5 supported or fixedly mounted upon one of the outermost I-beams 1, as illustrated in the Figure 1, as will be noted upon reference thereto, are formed with side walls disposed obliquely inwardly, while the free or upper end walls of these bearings have upwardly converging bracing rods 21 engaged therewith, that is, the upper or outer end walls of each of said bearings 5 are provided with brackets 22 having screw threaded sockets formed therein and into which the screw threaded adjacent ends 23 of said bracing rods 21 are adapted to be turned and to be locked in their engagement with said brackets 22 through the medium of locking nuts 24 engaged upon the screw threaded portions 23 and having jamming engagement with the adjacent ends of their respective brackets 22. The upper ends of these relatively converging bracing arms 21 engage with the oppositely angled sides of a bearing 25, said angled sides of the bearing having brackets 26 thereon formed with internally screw threaded openings adapted to receive the screw threaded adjacent end portions 27 of the bracing rods 21 therein, whereupon locking nuts 28, also engaged with the screw threaded portions 27, are turned into binding or jamming engagement with the adjacent ends of the brackets 26, hence, preventing undue rotation of their respective bracing rods 21. By reason of this construction and disposition of the bracing rods 21 upon the longitudinally spaced bearings 5, it will be understood that a strong and durable, yet adjustable support or mounting will be provided for the bearing 25, in that by loosening the locking nuts 24 and 28, bracing rods 21 may be rotated in directions to impart substantially vertical movement, in either direction, to said bearings 25. Likewise, it will be understood in this connection, that relative adjustment as between the bearing 25 and the bearings 5 immediately therebelow may be effected by this arrangement and construction of the bracing rods 21.

Rotatably received in and supported by the bearings 7, 10 and 25 is a driven shaft 29 carrying thereupon and particularly, between the standards 2 a fixedly mounted pinion 30 and a combined thrust and compressing roller 31, the latter being positioned between one of the standards 2 and the bearings 25 and in perpendicular relationship to the combined supporting and compressing roller 19, aforesaid.

In order that rotary motion may be transmitted from the counter shaft 17 to the driven shaft 29, I rotatably mount in the intermediately disposed bearings of the oppositely disposed and spaced standards 2, a stub shaft 32 mounting a power transmitting gear wheel 33, which, as will be noted upon reference to the Figures 2, 3 and 4, is in perpendicular alignment with the pinions 20 and 30 and is in constant mesh therewith. It will be thus seen that with rotation of the motion take-off pinion 20, such motion will be transmitted through the gear wheel 33 to the pinion 30 fixedly mounted upon the driven shaft 29 and that because of this, the combined thrust and compression roller 31 will be caused to rotate.

In event of vertical adjustment of the bearing 35 through the medium of the bracing rods 21, it becomes manifest that such movement will be compensated for by the intermediate bearing of the driven shaft 29, i. e., the bearing 7. To permit of this, it is manifest that the screw 8 may be rotated in the desired direction through the hand wheel 9. By the same token, it is to be understood that in the event that downward adjustment of the driven shaft 29 is desired or necessary. this may be effected by adjustment of the screw 8 through the hand wheel 9, providing, of course, that compensation for such movement is afforded through adjustment of the bearing 25 and its bracing rods 21. In this way, it will be understood that relative adjustment between the rollers 19 and 31, together with a supporting roller, to be presently described, may be effected.

A supporting roller 34 is provided in proximity to the remaining bearing bracket 5 disposed upon the opposite end of the I-beam 1 receiving the bearing bracket 5 which supports, in part, the roller 19, said supporting roller 34 being carried upon a stub shaft 35, one end of which is rotatably received in said bearing bracket 5 while the opposite end of the same is received in suitable bearing provided therefor in an adjacent portion of the upwardly tapered standard 2. This supporting roller 34, as will be noted upon reference to the Figure 1, is coincidentally disposed with respect to the rollers 19 and 31 and also, it is in perpendicular alignment therewith.

Rotatably received upon and supported by the rollers 19 and 34 is a plastic matter mold wheel or body, indicated, at this time, in its entirety by the numeral 36. This mold wheel is of annular or wing like formation, as is clearly shown in the Figure 1 and it is formed with relatively staggered circumferentially disposed series of radially extending mold cavities or pockets generally indicated by the numeral 37. The mold pockets 37, as will be noted upon reference to the Figure 1, taper inwardly and by consequence, the inner ends of said pockets, that is, those ends opening onto the inner peripheral surface of the mold wheel are of sizes less than are the outer ends of the pockets, that is, those ends which open onto the outer peripheral surface of said wheel. By reason of the staggering of the circumferentially disposed series of mold pockets 37, it will be understood that substantially obliquely disposed peripherally arranged roads are effected over the several peripheral surfaces of the mold wheel. Fixedly engaged about and mounted upon the outer peripheral surface of the mold wheel 36, in proximity to the opposite side portions thereof, are bearing rings 38. These rings may, if desired, be shrunk upon the mold wheel, or if conditions or preference may dictate, they may be secured by appropriate fastening devices to said wheel, or in certain instances, they may be integral parts of the wheel. The spacing between the bearing rings 38 is such as will permit of full exposure of the larger outer ends of the mold pockets 37 and also, it is sufficient to permit of the snug reception of the marginal or peripheral portions of the rollers 19 and 31 therebetween, hence, allowing the peripheries of these rollers to be brought into positive contact with the outer peripheral surface of the mold wheel. The width of the supporting roller 34, however, is greater than the distance between the bearing rings 38 and consequently upon this, it will be understood that the peripheral surface of said supporting roller 34 will have supporting engagement with the outer peripheral surfaces of the bearing rings, as is illustrated in the Figures 1 and 3.

Due to the mounting or arrangement of the mold wheel 36 between the rollers 19, 31 and 34, it will be seen that a rotatable support will be afforded the same, the normally lower portion of the mold wheel being cradled between the rollers 19 and 34 at a normally upper portion of the mold wheel being thrust engaged by the upper roller 31. Thus, a three point supporting contact with the mold wheel is effected. Also, by reason of the fact that the peripheral portions of the rollers 19 and 31 frictionally engage with the outer peripheral surface of the mold wheel 36, it will be seen that these rollers will serve, upon rotation, to not only impart rotary motion to said mold wheel 36, but also, to serve as means for effectually spreading and then forcing and compressing plastic matter discharged onto portions of the outer periphery of the mold wheel 36 into the various mold pockets 37. Furthermore, because of the engagement of the peripheral portions of said rollers 19 and 31 between the bearing rings 38, it will be obvious that lateral shifting movement of the mold wheel 36 with respect to any one of the three rollers—19, 31 or 34—will be positively prevented. The roller 34 with its broader tread, engaging with the peripheral surfaces of the bearing rings 38, will serve as a means for supporting the opposite side of the mold wheel and likewise, for imparting sufficient inward thrust to said mold wheel 36 to insure its retention in positive frictional contact with the peripheries of the aforesaid rollers 19 and 31. It is also to be understood that by the turning of the adjusting screw 8, through its handle 9, the rollers 19, 31 and 34, due to their relative arrangement, will be caused to engage with the outer peripheral surface of the mold wheel 36 at the desired or pre-selected pressures; attention being here invited to the fact that the roller 31 is equipped with a movable bearing, hereinbefore described, and by consequence, may be moved towards or away from the opposite rollers 19 and 34, hence, permitting an operator of the machine to optionally increase or decrease the pressure of engagement between the relatively spaced rollers 19, 31 and 34 whereby they will effectually function to rotatably support the mold wheel 36 and to engage with the outer periphery of said mold wheel under pressures of degrees which will allow them to effectually spread the plastic matter in process of molding over said outer periphery of the mold wheel and likewise, to insure forcing of such plastic matter into and through the mold pockets under adequate compression for forming the ultimate products.

To supply plastic matter to the outer periphery of the mold wheel 36 just in advance of the points of contact of the rollers 19 and 31 with said wheel, I provide chutes or their mechanical equivalents, indicated for convenience herein by the numeral 39. One of these chutes, and particularly, the chute discharging immediately in advance of the roller 19, is supported at a suitable incline upon a supporting bracket 40, fixedly mounted upon a portion of an adjacent I-beam 1 as indicated at 41, while the other chute 39 is supported at the desired incline upon or from a bracket arm 42 fixedly connected to a portion of the upwardly tapered standard 2, as at 43; this second mentioned chute, as will be noted upon reference to the Figure 1, being adapted to discharge plastic matter delivered thereto onto the outer periphery of the mold wheel 36 immediately in advance of the roller 31. It, of course, will be understood that the discharge ends of the several chutes 39 are disposed to open directly onto the outer peripheral portion of the mold wheel 36 between the bearing rings 38, hence, insuring the proper discharge or depositing of plastic matter upon the mold wheel for distribution thereover and forcing into and compressing in the mold wheel pockets 37.

Mounted just beyond the point of contact of the rollers 19 and 31 with the mold wheel 36 when the same is rotated, are blades or knives 44, the same being detachably and adjustably supported upon suitable brackets or holders 45, which in turn, are provided with brackets that are fixedly connected to adjacent portions of the upwardly tapered standard 2, as indicated at 46. The cutting portions of these blades 44 are disposed immediately adjacent to the inner peripheral surface of the mold wheel 36. Consequently upon this and because of the oblique disposition of said blades, it will be understood that with rotation of the mold wheel 36 thereby, the molded and compressed plastic bodies exuding from the inner open ends of the mold pockets 37 will be severed; the molded blocks or bodies, then dropping, by gravity, onto a suitable discharge chute (not shown herein), whereupon they are directed or delivered into some suitable receiving receptacle.

In operation of my improved plastic body molding machine, rotary motion is delivered or transmitted to the driving shaft 12, from whence, it is transmitted by the gearing 15 and 16 to the roller 19. Simultaneously, rotary motion is transmitted from the counter shaft 17 through the gearing 20, 33 and 30 to the driven shaft 29, thus rotating the roller 31. Such rotation of the rollers 19 and 31, by reason of their frictional contact with the outer peripheral surface of the mold wheel 36 will impart rotary motion to the latter, causing it to rotate as between the three point support therefor, to wit, the rollers 19, 31 and 34. At this time, plastic matter, such for example, as stock food of a plastic consistency is delivered from a suitable source of supply to the chutes 39, whereupon said plastic matter will be discharged onto the outer peripheral surface of the mold wheel 36 immediately in advance of the rollers 19 and 31. Rotation of these rollers 19 and 31, together with the mold wheel 36, will cause the plastic matter to be passed under or by the peripheral portions of said rollers, and this operation will serve as a means for effectually distributing the plastic matter over the outer peripheral surface of the mold wheel and at the same time, to force said matter into the open outer ends of the mold wheel pockets 37, compress the same therein and force the molded bodies or blocks from the reduced open inner ends of said mold pockets. With continued rotation of the filled mold pockets in the mold wheel 36, the exuding bodies of plastic matter will be sheared or cut away from the inner peripheral surface of the mold wheel 36 by engagement of the knives 44 therewith, the molded bodies dropping onto a suitable discharge chute (not shown) whereupon they are delivered to a receiving receptacle for drying or setting and then, packaging.

As hereinbefore described, positive contact as between the rollers 19, 31 and 34 and the mold wheels 36 may be at all times insured by reason of the adjustable mounting of the bearings 7 and 25, the former being received in the upper portion of the upwardly tapered standard 2 and the latter being rendered adjustable because of its mounting or support upon the adjustable bracing rods 21. Thus, wearing of the contacting active or working parts of my improved machine may be readily taken up or compensated for at the desired times and by reason of this, effectual operation of the machine over a prolonged period of time will be insured. Furthermore, it will be understood that because of the selective adjustability of the adjusting screw 8, the rollers 19, 31 and 34 may be caused to engage with the outer peripheral surface of the mold wheel 36 under pre-selected or effectually adjusted pressures. Also, by reason of the manner in which rotary motion is transmitted to the rollers 19 and 31 and thence, to the mold wheel 36, it will be understood that but a minimum of operating power will be required for the machine and because of this, power consumption during operation of the machine will be materially reduced. Likewise, it is to be noted that because of the simplified construction of the working component parts of the machine and their equally simplified mode of assembly, any of said parts are conveniently and readily accessible for adjustment, repairs or replacement, as conditions or preference may dictate.

Manifestly, the construction shown is capable of considerable modification and such modification as is within the scope of my claims, I consider within the spirit of my invention.

What I claim is:

1. In a molding and compressing machine, an annular rotatable mold having a plurality of radially disposed pockets formed therein and extending therethrough, relatively adjustable means engaging the outer peripheral surface of said mold for supporting the same and for forcing and compressing plastic matter into and through the pockets, and means cooperable with the discharge portions of the mold pockets for removing the molded and compressed plastic matter from the same as it exudes from said pockets.

2. In a molding and compressing machine, an annular mold having a plurality of pockets formed therein and extending therethrough, relatively adjustable means engaging with the outer periphery of said mold for movably supporting the mold and for forcing and compressing plastic matter into and through said pockets, and means cooperable with the mold for removing the molded and compressed plastic matter from the same as it exudes from said pockets.

3. In a molding and compressing machine, an annular mold having a plurality of pockets formed therein and extending therethrough, relatively adjustable means engaging the outer peripheral surface of the mold at intervals thereabout for rotatably supporting the same and for forcing and compressing plastic matter into and through the mold pockets, and means cooperable with said mold for removing the molded and compressed plastic matter from the same as it exudes from the pockets.

4. In a molding and compressing machine, a rotatable ring like mold wheel having circumferentially arranged and radially disposed pockets formed therein and extending from the outer peripheral surface of the inner peripheral surface thereof, a plurality of rollers receiving said mold wheel therebetween and engaging with the same, certain of said rollers being adjustable with respect to the outer peripheral surface of the mold wheel, one of said rollers engaging with the mold wheel outer peripheral surface in a manner to prevent relative lateral shifting movement as between said wheel and the rollers, the others of said rollers having direct frictional contact with the outer peripheral surface of the mold wheel for imparting rotary motion thereto and for forcing and compressing plastic matter into and through the mold pockets, and means cooperable with the inner peripheral surface of the mold wheel for removing the molded and compressed plastic matter from the same as it exudes from the pockets.

5. In a molding and compressing machine, a bed, relatively spaced movable supporting, motion transmitting and compressing means carried by the bed, a mold having a plurality of pockets therein engaging said means and movable thereby, means for delivering plastic matter to portions of the mold whereby with movement of said mold the matter will be forced and compressed, by the movable supporting, motion transmitting and compressing means, into and through pockets in said mold, and means cooperable with the said mold for removing the molded matter therefrom as it exudes from the mold pockets.

6. In a molding and compressing machine, relatively spaced movable combined supporting driving and compressing means, an annular rotatable mold provided with a plurality of pockets therein engaging said supporting driving and compressing means, means for delivering plastic matter to portions of the mold whereby with movement of said mold, the matter will be forced and compressed, by the combined means, into and through the pockets in said mold, and means cooperable with the mold for removing the molded matter therefrom as it exudes from the mold pockets.

7. In a molding and compressing machine, a rotatable mold having a plurality of pockets therein, combined supporting, driving and compressing means arranged to receive and support said mold therebetween, means for transmitting motion to certain of said supporting, driving and compressing means, means for delivering plastic matter to portions of the mold, whereby with rotation of the same, said matter will be forced and compressed, by the combined means, into and through the mold pockets, and means cooperable with the mold for removing the molded matter therefrom as it exudes from the mold pockets.

8. In a molding and compressing machine, a rotatable mold having a plurality of pockets therein, a combined supporting and compressing means engaging with the outer peripheral surface of said mold, means for delivering plastic matter to the outer peripheral surface of the mold, whereby with rotation of said mold, said matter will be forced and compressed, by said combined supporting and compressing means, into and through the pockets in said mold, and means cooperable with the mold for removing the molded matter therefrom as it exudes from the mold pockets.

9. In a molding and compressing machine, a mold having a plurality of pockets therein, combined supporting and compressing means engaging with said mold at relatively spaced intervals, certain of said combined means being adapted to transmit motion to the mold, means for delivering plastic matter to those portions of said mold engaged by such combined means, whereby with movement of the mold said matter will be forced and compressed, by the combined means, into and through the mold pockets.

10. In a molding and compressing machine, a rotatable mold having a plurality of pockets therein, combined plastic matter compressing and supporting means, said combined means receiving and supporting the rotatable mold therebetween in cradle-like fashion, means for delivering plastic matter to the outer peripheral surface of the mold, whereby with movement of the same, said matter will be forced and compressed, by the combined means, into and through the pockets in the mold, and means cooperable with the mold for removing the molded matter therefrom as it exudes from said mold pockets.

11. In a molding and compressing machine, a rotatable mold having a plurality of pockets therein, combined plastic matter compressing and supporting means, said means receiving and supporting said mold therebetween in cradle-like fashion, said combined means being adjustable with respect to each other whereby to engage with the outer peripheral surface of said mold under different pressures, means for delivering plastic matter to portions of the mold whereby with movement of the same, said matter will be forced and compressed, by the combined means, into and through the pockets in the mold, and means cooperable with said mold for removing the molded matter therefrom as it exudes from the mold pockets.

12. In a molding and compressing machine, a bed, relatively spaced combined supporting and compressing means carried by said bed, a mold having a plurality of pockets therein movably supported and engaged by said combined supporting and compressing means, means connected to the combined supporting and compressing means for causing the same to be engaged with said mold under preselected pressures, means for delivering plastic matter to portions of the mold whereby with movement of the same, said matter will be forced and compressed, by the combined supporting and compressing means, into and through pockets in said mold, and means cooperable with the mold for removing the molded matter therefrom as it exudes from the mold pockets.

13. In a molding and compressing machine, a bed, a plurality of relatively spaced combined supporting and compressing rolls rotatably mounted on said bed, an annular mold having a plurality of pockets therein rotatably received between and supported by said combined supporting and compressing rolls, and means connected to said rolls for permitting the same to be relatively adjusted whereby to exert different pressures upon the engaged portions of said mold.

14. In a molding and compressing machine, a bed, relatively spaced combined supporting and compressing rolls mounted on said bed, an annular mold having a plurality of pockets therein, the ends of which open respectively, onto the inner and outer peripheral surfaces of said mold, said mold being received and supported between said rolls, and means on said bed connected to said rolls operable whereby to cause the rolls to be brought into engagement with the outer peripheral surface of the mold under different pre-selected pressures.

15. In a molding and compressing machine, a bed, a plurality of combined supporting and compressing rolls on said bed arranged in relatively spaced relation, a mold having a plurality of pockets therein opening onto its inner and outer surfaces, rotatedly received between and supported by said rolls, certain of said rolls being engaged with the mold laterally of its vertical axis and another of said rolls engaging with the mold at a point in alignment with the vertical axis thereof, and means connected to said rolls for causing the same to engage with the mold at a predetermined pressure.

16. In a molding and compressing machine, a bed, relatively spaced rotatable rolls on the bed, an annular mold having a plurality of radially disposed pockets therein, opening at their opposite ends onto the inner and outer peripheral surfaces of said mold, the mold being received between and rotatably supported by said rolls, means connected to one of said rolls for transmitting motion thereto, other means connected to said rolls for effecting relative adjustment thereof, whereby said rolls will engage with the outer peripheral surface of the mold under a predetermined pressure, means for delivering plastic matter to portions of the outer peripheral surface of the mold whereby with rotation of the mold, said matter will be forced and compressed, by the rolls, into and through the pockets in the mold, and means cooperable with said mold for removing the molded matter therefrom as it exudes from the mold pockets.

17. In a machine of the character described, a rotatably driven mold having a plurality of pockets therein, combined mold supporting and plastic matter compressing means engaging with the outer peripheral surface of said mold, and means for directing plastic matter to the outer peripheral surface of the mold whereby with rotation thereof, said matter will be forced and compressed by the combined supporting and compressing means into and through the pockets in said mold.

18. In a machine of the character described, a rotatably driven mold having a plurality of pockets therein, combined supporting and compressing means engaging with the outer peripheral surface of said mold at relatively spaced intervals, and means for directing plastic matter to portions of the outer peripheral surface of the mold whereby with rotation thereof, said matter will be forced and compressed by said combined supporting and compressing means into and through the pockets in the mold.

In witness whereof I have hereunto set my hand.

JOHN A. O'HALLORAN.